(12) United States Patent
Kwirandt et al.

(10) Patent No.: US 8,663,761 B2
(45) Date of Patent: Mar. 4, 2014

(54) PLASTIC PREFORMS WITH MARKING FOR POSITION DETECTION

(75) Inventors: Rainer Kwirandt, Barbing (DE); Gerald Huettner, Vilseck (DE)

(73) Assignee: Krones AG (DE)

( * ) Notice: Subject to any disclaimer, the term of this patent is extended or adjusted under 35 U.S.C. 154(b) by 0 days.

(21) Appl. No.: 13/269,370

(22) Filed: Oct. 7, 2011

(65) Prior Publication Data

US 2012/0085670 A1 Apr. 12, 2012

(30) Foreign Application Priority Data

Oct. 7, 2010 (DE) .......................... 10 2010 047 619

(51) Int. Cl.
*B32B 1/00* (2006.01)
*B32B 1/02* (2006.01)

(52) U.S. Cl.
USPC .... 428/35.7; 428/36.6; 428/36.92; 428/542.8

(58) Field of Classification Search
USPC ........... 428/34.1, 34.4, 34.6, 34.7, 35.7–35.9, 428/36.4–36.7, 36.9–36.92, 542.8
See application file for complete search history.

(56) References Cited

U.S. PATENT DOCUMENTS

| 5,660,902 | A * | 8/1997 | Unterlander et al. ........ 428/35.7 |
| 6,287,507 | B1 | 9/2001 | Appel et al. .................. 264/521 |
| 6,555,191 | B1 * | 4/2003 | Smith et al. ................ 428/36.92 |
| 6,740,284 | B2 * | 5/2004 | Darr et al. ...................... 264/521 |
| 6,769,895 | B2 | 8/2004 | Derouault et al. ............. 425/145 |
| 7,531,125 | B2 * | 5/2009 | Dygert et al. .................. 264/535 |
| 2003/0020193 | A1 | 1/2003 | Hamamoto et al. ......... 264/40.1 |
| 2005/0048235 | A1 * | 3/2005 | Dygert .......................... 428/35.7 |
| 2006/0204694 | A1 * | 9/2006 | Porter et al. ................. 428/35.7 |
| 2011/0057362 | A1 | 3/2011 | Meinzinger ................... 264/519 |

FOREIGN PATENT DOCUMENTS

| EP | 0 835 736 | 4/1998 | ............. B29C 49/42 |
| EP | 1279477 | 1/2003 | ............. B29C 49/00 |
| EP | 2292407 | 3/2011 | ............. B29C 49/42 |
| JP | 56062132 | 5/1981 | ............. B29C 49/00 |
| JP | 2007175994 | 7/2007 | ............. B29B 11/12 |
| JP | 2007283529 | 11/2007 | ............. B29B 11/12 |
| WO | WO9732713 | 9/1997 | ............. B29C 49/64 |
| WO | WO0153063 | 7/2001 | ............. B29C 49/02 |

OTHER PUBLICATIONS

German Search Report, dated Feb. 13, 2012 (5 pgs).

* cited by examiner

*Primary Examiner* — Walter B Aughenbaugh
(74) *Attorney, Agent, or Firm* — Hayes Soloway P.C.

(57) ABSTRACT

A plastic preform, having a base body, a thread region arranged on the base body, wherein the thread region is formed in one piece with the base body, and a ring-shaped section which is arranged underneath the thread region, which extends outwards in a radial direction (R) of the plastic container and which is formed in one piece with the base body, wherein the ring-shaped section has a first surface facing the base body and a second surface facing the thread region. At least one optically perceivable marking is arranged on the surface facing the base body.

14 Claims, 2 Drawing Sheets

PLASTIC PREFORMS WITH MARKING FOR POSITION DETECTION

BACKGROUND OF THE INVENTION

The present invention relates to a plastic preform. Such plastic preforms have been known for a long time from the prior art and e.g. serve to be moulded to become plastic containers (e.g. beverage bottles) in the course of blow moulding processes, in particular stretch-blow moulding processes. In the process, the heated plastic preform is usually moulded to a container by means of a stretch-blow moulding machine. In this connection, also known from the prior art are containers which are shaped such that they are not rotation-symmetrical but have an oval cross-section, for example. Additionally, containers exist wherein the lid has to be orientated so it is fitted in the correct position with regard to the bottle body which may be required because of the container design or also because of technical conditions.

This orientation is usually achieved by means of cams or notches in the region of the mouthpiece of the plastic preform which can be aligned with a mechanical tool. This in turn results in impaired performances.

A device and method for blow moulding a container is known from EP 1 279 477 A1. Furthermore, EP 0 835 736 B1 describes a device for blow moulding and a device for injection stretch-blow moulding of containers. In the process, rotation devices to rotate the plastic preform about its longitudinal axis during the transport of the preform as well as alignment devices to align the handle projecting from the preform into a given direction are provided.

An object of the present invention is to provide a plastic container and in particular a plastic preform which can be more easily aligned or sealed in comparison with preforms known from the prior art.

SUMMARY OF THE INVENTION

A plastic container according to the invention and in particular a plastic preform has a base body as well as a thread region arranged on the base body, the thread region being formed in one piece with the base body. Furthermore, the plastic container preferably has a section of which at least parts are annular (i.e. which is section wise annular or rather an annular body) and which is arranged underneath the thread region, extends outwards in a radial direction of the plastic container and is formed in one piece with the base body. In this connection, the annular section has a first surface facing the base body and a second surface facing the thread region (or rather facing away from the base body). According to the invention, at least one optically perceivable marking is arranged on the first surface of the annular section facing the base body.

The design of the plastic container is significantly influenced by the fact that the material is often transparent or partially transparent. Thus, most of the light radiating onto the plastic container passes therethrough, and it is possible to look through the plastic container. It is preferred to design the plastic container in such a way that the disturbances due to the light passing through are minimised and the effect of the light reflecting from the surface is optimised.

An annular section is understood to mean a region which here encloses a geometrical longitudinal axis completely, for example. In this connection, this annular section can be formed into a circle; however, it would also be possible for the section to be formed into an oval and/or polygon, for example. The annular section preferably has a constant width in the radial direction; however, it would also be possible that the radial width of this annular section varies in the circumferential direction of the plastic preform.

Advantageously, the annular section is a body with a completely annular shape which is formed in an advantageous manner uniformly circumferential. However, it would additionally also be possible that the annular body extends at a slight angle to the radial direction. However, the annular body advantageously extends substantially exactly in said radial direction.

Within the spirit of the present invention, a marking is understood to mean in particular codings and/or recesses in any geometrical shape. The markings preferably have a U shape, V shape, pyramid shape or cone shape.

In another advantageous embodiment, said marking also extends in the radial direction which simplifies the production of said plastic preform.

In contrast to the prior art, it is thus proposed to apply a marking—instead of alignment cams and notches—to the underside of the annular body, this in particular being a carrier ring. The alignment cams and notches which are adapted to the machines of some manufacturers have certain disadvantages. On the one hand, some of them are located at optically badly accessible points between the carrier ring and the thread turns. Additionally, examples are also known in which the marking was applied to the upper side of the carrier ring, the marking being partly concealed by grippers such as holding tongs in this case. Notches in the carrier ring are typically made very large and often extend to the base body of the plastic preform, or they are formed as a through-hole from the first surface to the second surface of the carrier ring. This results in the fact that due to these notches, the containers can only be elaborately sealed at the mouthpiece during the blow moulding process.

However, in other stretch-blow moulding machines, the sealing is performed via the carrier ring so that such notches can at least interfere with and even completely prevent the blow moulding process.

In an advantageous embodiment, the base body of the plastic preform is expandable. Advantageously, the marking serves for the detection of a rotational position of the plastic preform with regard to its longitudinal direction. However, it would also be possible to output information by means of the marking. Thus, it would for example be conceivable that information relating to the plastic preform could be output by means of the marking, and corresponding machines of the plant could react accordingly on this information.

Many beverage bottlers and converters employ different plastic preforms for the production of the same container. However, this is associated with adaptations of the parameters for the blow moulding and heating processes. Plastic preforms not belonging to the specific process can possibly still be located in the plant. This in turn can result in interruptions on the production line, in particular when an incorrect to plastic preform is not recognized and not discharged accordingly from the blow moulding machine. In this case, the marking can serve to discharge respective incorrect plastic preforms.

In an advantageous embodiment, the marking is a recess formed in the first surface. This is to be understood to mean that the marking can e.g. be a notch or the like which is thus mechanically formed in said first surface. The plastic container is preferably made from PET.

Said recess advantageously does not extend to the second surface. Thus, the marking is in this case only arranged on the underside of the annular section or the carrier ring. In this way, the marking is also optically well accessible, a detection of the marking in particular not being impeded by gripping elements and also the thread of the plastic preform. Thanks to the marking advantageously not running through the annular body or the carrier ring, the carrier ring has an uninterrupted sealing surface on its second surface which is particularly advantageous for the subsequent blow moulding process.

Advantageously, at least parts of the annular section are unpolished, and the annular section is advantageously completely unpolished. Plastic preforms are usually polished at their surface and also at the surface of said carrier ring. In the present embodiment, however, it is advantageous to deliberately leave said surface unpolished. In this way, it is possible to limit the ability to see from the base body of the plastic preform through to a background, and improved visibility of critical points of the plant, such as e.g. edges of a gripping clamp, is ensured in this way. However, it would conversely also be possible that the carrier ring is polished and the notch or the marking is matt.

Advantageously, the lateral faces of the marking diverge strongly from both the horizontal and the vertical. They are V-shaped, for example. Because of this, on the one hand, the lateral faces of the marking can be seen large in the image in the preferably almost vertical direction of observation. On the other hand, in contrast to the horizontal face of the carrier ring, they no longer fulfil the reflection requirement between illumination direction and direction of observation. Because of this, the markings appear dark on the reflecting carrier ring. To enhance the effect, the marking can advantageously also be polished. In this way, a very good detection of the marking with optical image capture devices is possible.

As mentioned, the underside of the carrier ring of the plastic preform is advantageously matted, i.e., the surface diverges finely grained slightly from the horizontal. The advantages resulting from this are that such a surface eases the tough reflection requirements between an illumination direction and a direction of observation. Because of this, the reflex is more grained but is uniformly bright in exchange. In this case, the marking or notch stands out particularly well.

Furthermore, the visibility is disturbed cloudily by the carrier ring of the plastic preform, and the influence of disturbances behind the carrier ring which can result from the holding tong (the gripper), the thread and the surroundings is reduced by this. In this way, the image can be more easily interpreted.

Additionally, said rough surface also reduces production costs. The injection moulding tools used to produce the plastic preform are usually rough, the first processing steps being performed with more coarse tools. To create a highly glossy surface, expensive and time-consuming polishing methods are required. These methods can be dispensed with in the region of the carrier ring of the plastic preform and because of this, a better inspection of the plastic preform is in fact possible.

Furthermore, it would also be possible to apply several markings or codings to the plastic preform. Besides a marking on the underside of the carrier ring, such markings can also be applied to other surfaces, such as e.g. underneath the mouthpiece. Such codings can be formed, for example, by one or more lines such as notches or by the geometrical design of such a notch. Additionally, other structures can be provided instead of radial notches, e.g. structures having inclined lateral shoulders, pyramid-shaped or cone-shaped indentations, for example. These codings can also be used for the orientation of the plastic preform.

In this way, a "machine-readable" plastic preform can be made available. In this connection, the treatment machine can classify the plastic preform by means of this code (in particular applied to the carrier ring) and can react on the plastic preform, if required. Thus, the machine can initiate suitable measures, such as e.g. discharge of the plastic preform, adaptation of processing parameters, orientation of the plastic preform and the like.

In another advantageous embodiment, the annular body encloses the plastic preform completely and is formed without continuous recesses in the longitudinal direction of the plastic preform. As mentioned above, the blowability in a subsequent moulding process is simplified in this way.

In another advantageous embodiment, the plastic container is an injection moulded article. In this connection, it is possible to already integrate said marking into the plastic preform during the injection moulding process.

In another advantageous embodiment, the annular section extends beyond the thread region in the radial direction of the plastic container. In this way, the sealing by means of a blowing nozzle in a moulding process is simplified.

In another advantageous embodiment, said marking is only arranged on the first surface but is optionally also perceivable from above.

In another advantageous embodiment, the plastic container is at least partially transparent. Herein, at least partially is to be understood to mean that on the one hand, individual geometric regions of the plastic preform can be formed transparently; however, it is also possible that partially transparent is to be understood to mean a certain transparency, for example a 60 or 50% transparency, or a transparent colour.

If the material of the plastic preform contains highly scattering particles which make the plastic preform opaque or diffuse, diffuse scattering prevails. Structures as discontinuous notches which make use of the reflection properties are then no longer optically perceivable as well as before. As the diffuse scattering is very bright in the majority of cases, the distance to the disturbances of the background becomes bigger. This diffuse scattering then gives the plastic preform a very uniform appearance. In this case, a continuous marking or notch (running through the carrier ring) is preferably used. However, such a continuous notch or recession is preferably only provided on the radial outer edge of the plastic preform and thus in particular does not extend to the base body of the plastic preform. In this way, enough space remains on the carrier ring for its sealing in the blow moulding machine or during the blow moulding process.

BRIEF DESCRIPTION OF THE DRAWINGS

Other advantages and embodiments will become evident from the attached drawings.

These show.

DETAILED DESCRIPTION OF THE INVENTION

Figure 1:
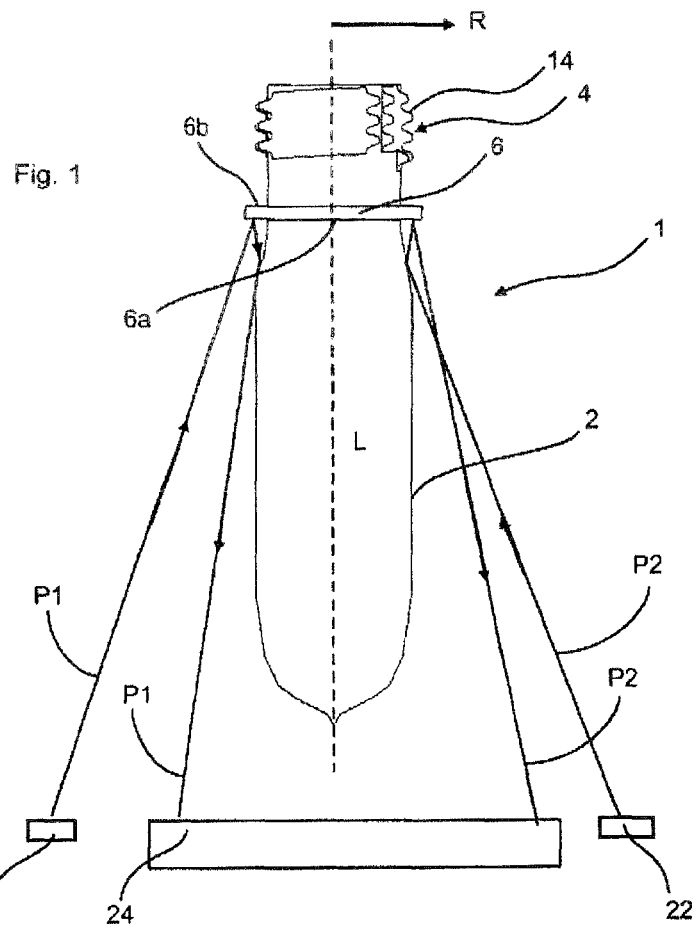
FIG. 1 a side view of a plastic preform according to the invention.

FIG. 1 shows a side view of a plastic preform 1 according to the invention. Here, this plastic preform has a base body 2, this base body being expandable in the course of an expansion process, and a thread region 4 which in this case is formed in one piece with the base body 2. The thread region 4 is not stretched in the course of the expansion process. The reference numeral 14 relates to a thread turn of the thread of the plastic preform. Furthermore, the plastic preform has an annular body, i.e. a carrier ring 6 which in turn has a surface 6b facing up, i.e. facing the thread region 4, and a surface 6a facing down, i.e. facing the base body 2.

In an inspection of plastic preforms made from clear, at least partially translucent material, the major proportion of the light passes through the translucent carrier ring 6. This proportion causes disturbances in the room, at the thread or at the holding device which are well optically perceivable through a polished carrier ring. To lessen these disturbances, the background and the holding device should ideally have a matt, highly absorbing and abrasion-resistant surface. All-encompassing holding devices are ideal as they form a uniform background for the carrier ring—unfortunately, they are only realisable to a limited extent.

In preforms made from translucent material, the image-defining part of the light is the reflected light. During the inspection, the fulfilment of the reflection requirement between illumination and direction of observation thus has to be ensured.

However, if the carrier ring 6 is not formed completely transparently but is unpolished, as suggested in one embodiment, light can be reflected more evenly on surface 6a. The chains of arrows F1 and P2 illustrate possible light paths during the inspection of this container or the underside 6a of the carrier ring. In this connection, illumination devices 22, such as e.g. LEDs arranged in an annular shape about the longitudinal direction L of the plastic preform, are directing light onto the plastic preform, and the reflected light is captured by a camera device 24, and a (spatially resolved) image of the underside of the plastic preform 1 or the carrier ring is thus taken.

Thus, the actual image is in each case generated by a double reflection on the carrier ring 6 and on the base body 2 of the plastic preform 1. As the surfaces (of the base body 2) are quite glossy, only a small angular region is formed in which the reflection requirements are fulfilled. This is the starting point for capturing the marking. Therefore, the base body 2 of the plastic preform is preferably polished.

In the light path P1, the light initially reaches the underside of the carrier ring and is guided from there to the image capture device 24 (which can be implemented as a camera, for example) via the base body 2. In the light path P2, the light is initially reflected on the base body 2 and then reaches the image capture device 24 via the underside 6b of the carrier ring. Because of this, the plastic preform described herein is particularly suited for pericentric (or all-encompassing) observation along its longitudinal direction L.

Figure 2:
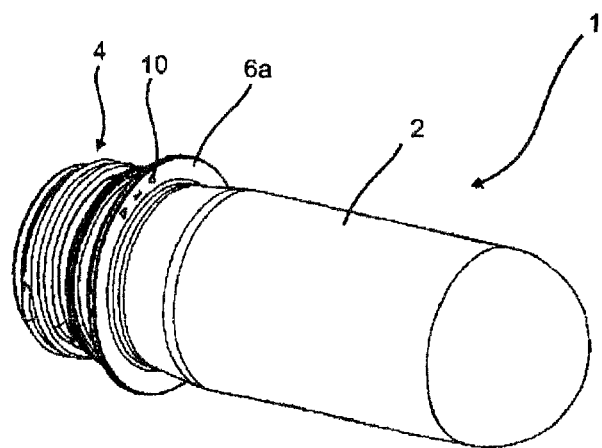
FIG. 2 a perspective view of a plastic preform according to the invention.

FIG. 2 shows a perspective view of a plastic preform 1 according to the invention. Here, markings 10 can also be seen on the underside 6a of the carrier ring 6. These markings can be detected by means of optical inspection devices. In this connection, it would be also possible—as mentioned above—to arrange a plurality of markings such that properties of the plastic preform can be gathered from these markings. It would also be possible to apply, for example, a barcode or similar to the underside 6a of the carrier ring 6. Additionally, it is conversely also possible to also provide such a coding 10 so that the machine can determine which plastic preform is located in the machine, in this case it also being possible to use the marking 10 to determine the orientation of the plastic preform with regard to its longitudinal axis L.

Figure 3:
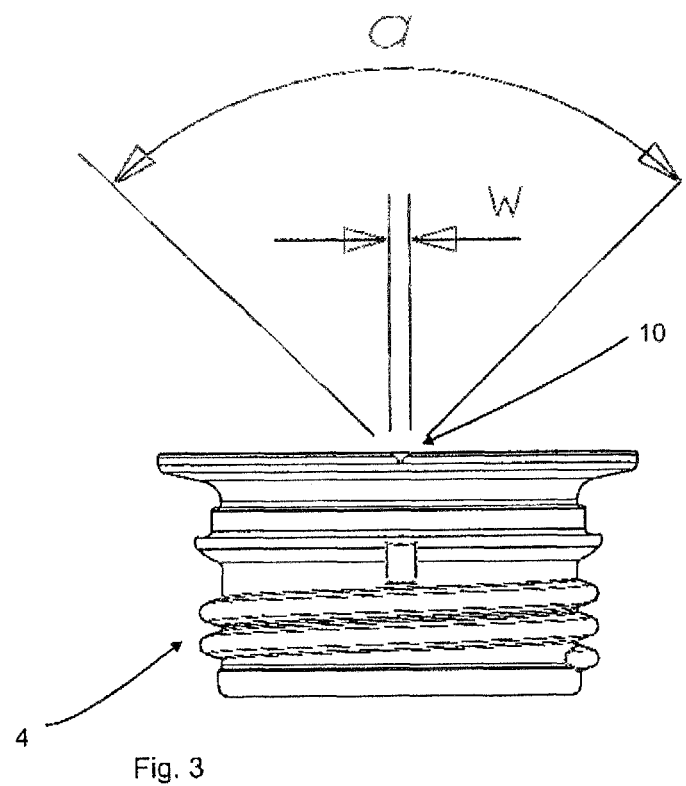
FIG. 3 a partial depiction to illustrate the marking of the plastic preform.

FIG. 3 shows a detailed depiction of a plastic preform and its marking, respectively. In this design, the marking has a width w which is between 0.5 mm and 2 mm. Here, the marking or notch is arranged in a V shape, and both lateral faces of this V are in this case within an angle a which is advantageously between 60° and 120°.

Figure 4:
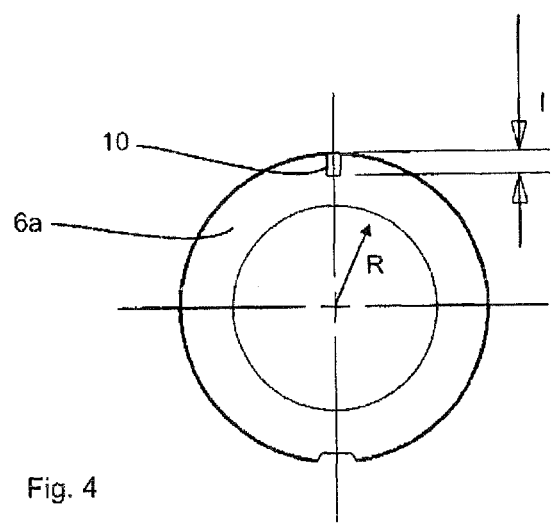
FIG. 4 another depiction to illustrate the marking.

FIG. 4 shows a top view of the carrier ring of FIG. 3. It can be seen that in this case the marking runs inwards from the edge of the carrier ring 6 and extends radially inwards over about half of the carrier ring.

In this connection, length l of this marking is between 2 mm and 8 mm, preferably between 2 mm and 5 mm.

The applicant reserves the right to claim all the features disclosed in the application documents as essential for the invention, provided that they are, alone or in combination, novel in comparison to the prior art.

LIST OF REFERENCE NUMERALS

1 Plastic preform
2 Base body
4 Thread region
6 Carrier ring
6a Surface of the carrier ring facing the base body 2
6b Surface of the carrier ring facing the thread region 4
10 Marking
14 Thread turn
22 Illumination device
24 Observation device
L Longitudinal axis of the plastic preform 1
P1, P2 Chains of arrows, light paths
a Angle
w Width
l Length
R Radial direction

The invention claimed is:

1. A plastic preform having a base body and a thread region arranged on the base body, wherein the thread region is formed in one piece with the base body, and a ring-shaped section which completely surrounds a portion of a geometrical longitudinal axis of the preform and which is arranged underneath the thread region and extends outwards in a radial direction (R) of the plastic preform and is formed in one piece with the base body, wherein the ring-shaped section has a first surface facing the base body and a second surface facing the thread region,
wherein
at least one optically perceivable marking is arranged on the surface facing the base body and that the ring-shaped section completely surrounds the plastic preform and is formed without continuous recesses in the longitudinal direction (L) of the plastic preform, wherein parts of the ring-shaped section are unpolished and wherein the at least one marking is polished.

2. The plastic preform according to claim 1,
wherein
the marking is a recess formed in the first surface.

3. The plastic-preform according to claim 1,
wherein
the plastic preform is an injection moulded article.

4. The plastic preform according to claim 1,
wherein
the ring-shaped section extends beyond the thread region in a radial direction (R).

5. The plastic preform according to claim 1,
wherein
the marking is only arranged on the first surface.

6. The plastic preform according to claim 1,
wherein
the plastic preform is at least partially transparent.

7. The plastic preform according to claim 1, wherein the ring-shaped body is a carrier ring of the preform.

8. The plastic preform according to claim 1, wherein the marking extends in a radial direction.

9. The plastic preform according to claim 7, wherein the carrier ring has an uninterrupted sealing surface for a subsequent blow moulding process on its second surface.

10. The plastic preform according to claim 1, wherein a length of the marking is between 2 mm and 8 mm.

11. The plastic preform according to claim 10, wherein a length of the marking is between 2 mm and 5 mm.

12. The plastic preform according to claim 1, wherein the marking has a shape selected from the group consisting of a U-shape, a V-shape, a pyramid shape and a cone shape.

13. The plastic preform according to claim 1, wherein the marking is only arranged on the first surface.

14. The plastic preform according to claim 1, wherein the base body of the preform is polished.

* * * * *